Feb. 5, 1952 T. FRANKEL 2,584,857

ALARM SYSTEM FOR UNATTENDED AUTOMATIC EXCHANGES

Filed Aug. 2, 1948 3 Sheets-Sheet 1

INVENTOR.
THEODORE FRANKEL
BY Winfred T. Powell
ATTORNEY

ALARM SYSTEM FOR UNATTENDED AUTOMATIC EXCHANGES

Filed Aug. 2, 1948 3 Sheets-Sheet 2

INVENTOR.
THEODORE FRANKEL
BY
Winfred T. Powell
ATTORNEY

Feb. 5, 1952 T. FRANKEL 2,584,857
ALARM SYSTEM FOR UNATTENDED AUTOMATIC EXCHANGES
Filed Aug. 2, 1948 3 Sheets-Sheet 3

INCOMING TRUNK CIRCUIT

*INVENTOR.*
THEODORE FRANKEL
*BY* Winfred T. Powell
ATTORNEY

Patented Feb. 5, 1952 2,584,857

UNITED STATES PATENT OFFICE 2,584,857

ALARM SYSTEM FOR UNATTENDED AUTOMATIC EXCHANGES

Theodore Frankel, Rochester, N. Y., assignor to Stromberg-Carlson Company, a corporation of New York Application August 2, 1948, Serial No. 42,092

10 Claims. (Cl. 179—27)

This invention relates to multi-office telephone systems and it more particularly pertains to multi-office systems which include one or more unattended automatic offices and it is concerned primarily with improved circuits for supervising the unattended offices.

It is the usual procedure in systems of the above type to provide switching apparatus which, in response to an unstandard condition in an unattended office, transmits an alarm signal to an attended office over one of the inter-office trunk lines. In some cases the alarm signal is transmitted over a regular trunk circuit when this trunk circuit is not in use for a telephone call and in other cases the alarm signal is transmitted over a separate trunk conductor not used for other services. The present invention is concerned with systems of the first mentioned type, that is, where alarm signals are transmitted over a regular inter-office trunk.

The main object of the present invention is the provision of means for transmitting an alarm from an unattended dial office to an attended manual or dial office, in which the transmitted alarm signal is of a different character from the regular calling signal transmitted over the inter-office trunk.

Another object of the present invention is the provision of means for transmitting an indication of an abnormal condition in the unattended office to the attended office, whereby a distinctive signal will continue to be displayed in the attended office until the operator dials an alarm checking number or the abnormal condition ceases to exist.

The various features of the invention, together with the operation of a system embodying the same, will be described in detail hereinafter, reference being had to the accompanying drawings comprising Figs. 1 and 2, which disclose sufficient portions of an inter-office trunk circuit and the alarm sending and checking equipment to enable one skilled in the art to understand the operation of the system.

Figure 1:
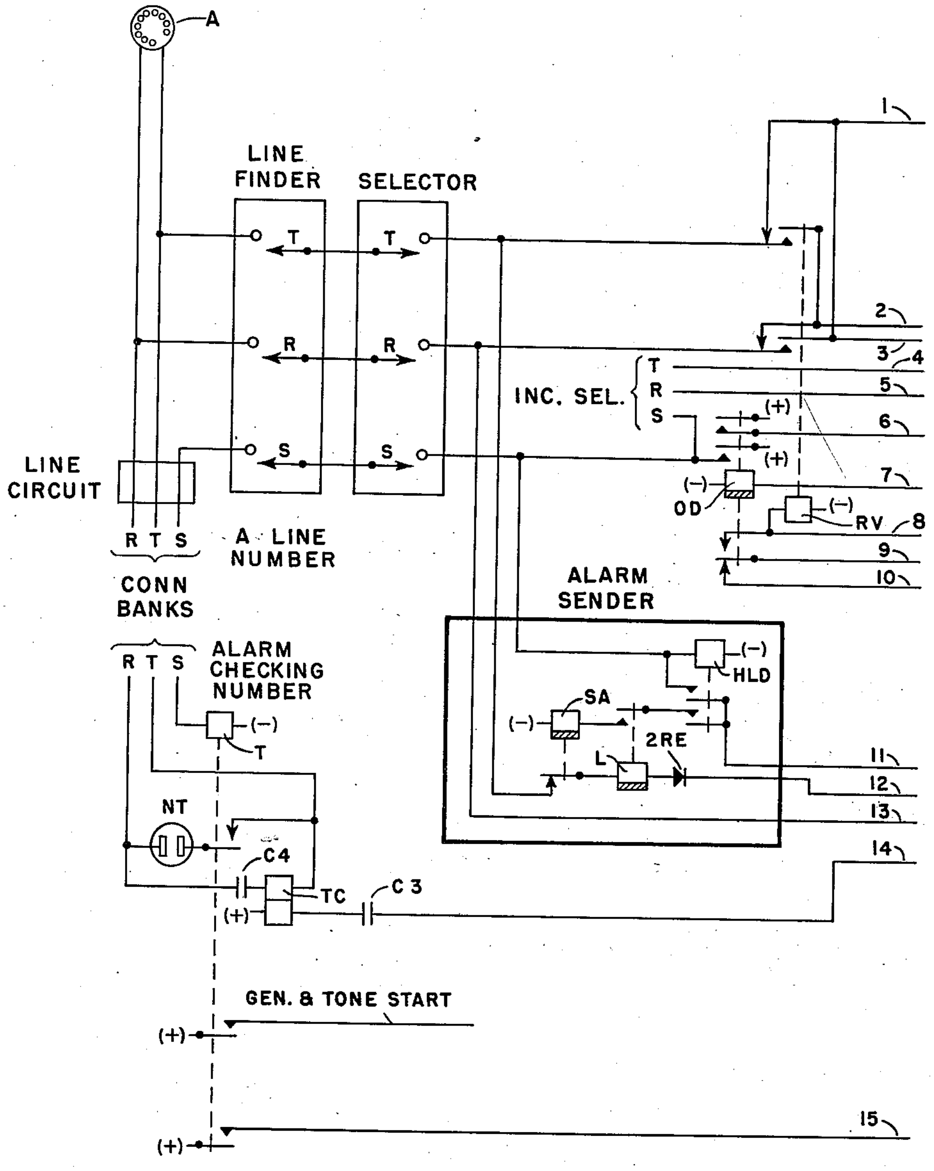
Figure 2:
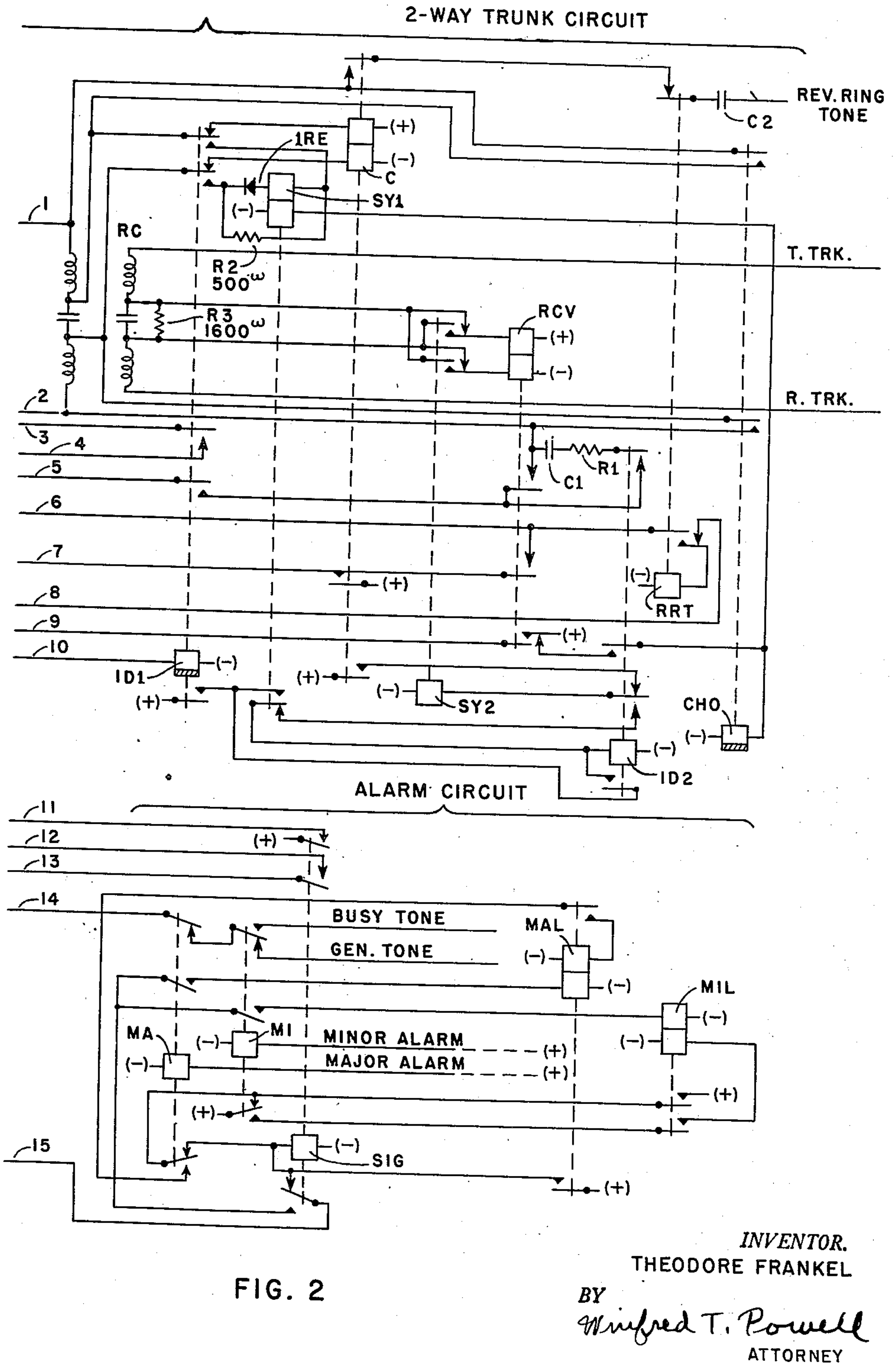
Figure 3:
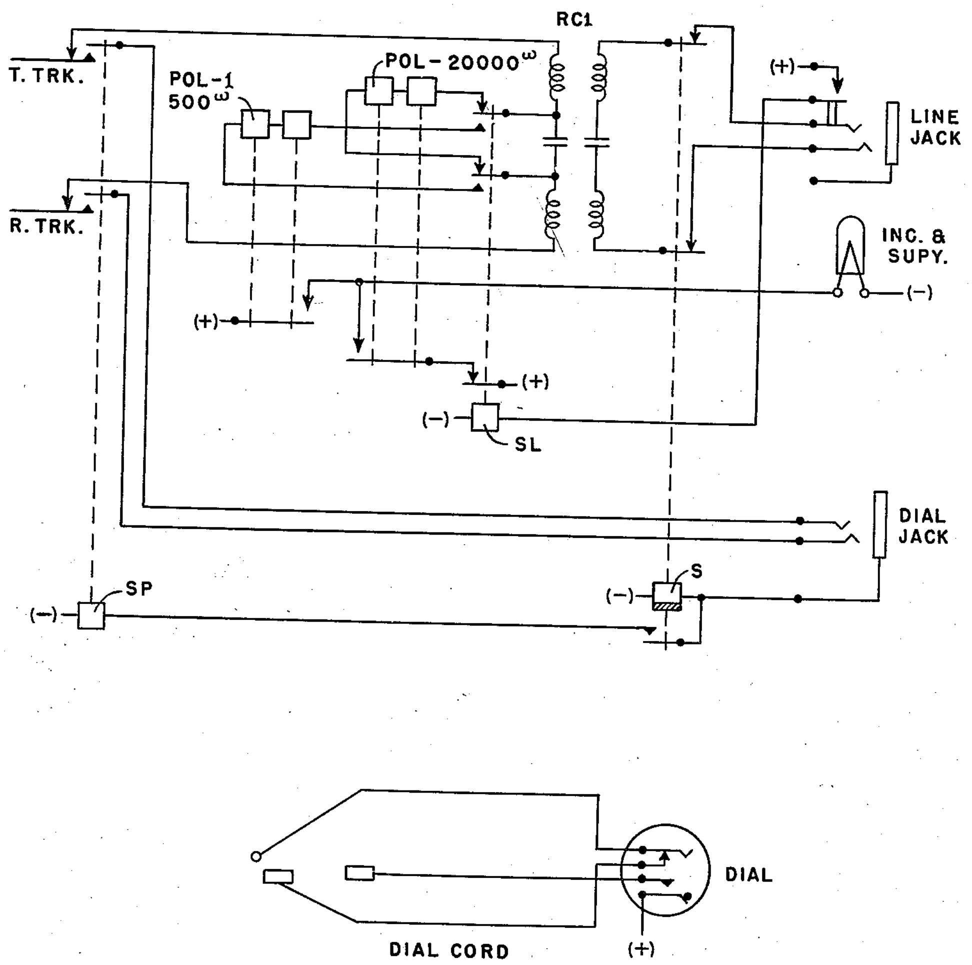

Figs. 1 and 2 show the switching apparatus at an unattended exchange and Fig. 3 shows the equipment at an attended manual exchange or toll switchboard associated with a trunk line extending to the unattended exchange shown in Figs. 1 and 2.

Referring to Fig. 1, the various circuits shown in this figure are assumed to be in one of the unattended dial offices which is connected by at least one trunk line to an attended office; the latter office may be manually operated or it may include a manual switchboard.

In the unattended office a dial telephone line having one or more dial stations connected thereto, one of which is indicated at A, is connected to an associated line circuit, this line circuit being arranged to extend a connection from a calling substation, such as substation A, by way of a line finder to a selector. When the calling line is extended to the selector, the two way trunk circuit leading to the distant attended office may be selected by dialing a particular trunk level digit for selecting the illustrated trunk circuit. The line finder and selector are illustrated in diagrammatic form, since these units of the system may be of any conventional form.

The line terminals are also connected to connector banks, as illustrated, in order that this line may be called by way of a connector for establishing connections to the illustrated line. Connector bank terminals are also illustrated as being connected to an alarm checking number, whereby the operator at the distant office may dial this number and determine, by means of tones transmitted over the connection, the condition of the apparatus in the unattended office, all which will be pointed out in the description which follows.

The two way trunk circuit associated with the trunk leading to the distant attended office is illustrated in the upper portion of Fig. 2. The alarm circuit, whereby an unstandard condition is effective to release one or more relays to indicate a particular alarm condition, is shown in the lower portion of Fig. 2. Within the heavy line rectangle an alarm sender is shown, this portion of the system being more particularly illustrative of the main feature of the present invention. The detailed operation of this alarm sender will be explained in detail hereinafter.

Fig. 3 illustrates the incoming trunk circuit connected to the trunk line associated with the two way trunk circuit illustrated in Fig. 2. This incoming trunk circuit terminates in a line jack and in a dial jack at the operator's position. An incoming call is answered by the operator plugging an answering cord (not shown) into the line jack in response to the lighting of the incoming lamp. An outgoing call is set up by the operator plugging a calling cord (not shown) into the line jack, then plugging the dial cord into the dial jack and dialing the desired number, after which the dial cord is removed from the dial jack and may be used in connection with other calls.

The operation of the various circuits will now be described in detail to better illustrate the various features of the invention, particular reference being had to the alarm sender in Fig. 1 to which the main feature of the present invention is directed.

A call from the attended office to the unattended office will first be described. When the operator inserts the calling plug (not shown) into the line jack, the local contact of this jack closes an obvious circuit for operating sleeve relay SL. The trunk line is normally energized at a low level over a circuit which may be traced from (+), upper winding of relay RCV of the two-way trunk circuit, break contact of supervisory relay SY2, upper right hand winding of the repeating coil RC, tip trunk conductor T. TRK., break contact of sleeve repeating relay SP, upper left hand winding of repeating coil RC1, break contact of relay SL, windings of polarized relay POL, break contact of relay SL, lower left hand winding of coil RC1, break contact of relay SP, ring trunk conductor R. TRK., lower right hand winding of coil RC, break contact of relay SY2 and lower winding of relay RCV to (−). Since the windings of relay POL are of very high resistance, there is insufficient current flow over this circuit to operate relay RCV in the unattended office and since the current flow is in the direction above traced, relay POL is not operated.

When relay SL is operated, as above described, the above circuit including the trunk conductors is switched from relay POL to the comparatively low resistance windings of relay POL1, thus energizing the trunk at a comparatively high level, and since the current is in the proper direction for operating relay POL1, this relay will operate and close an obvious circuit for lighting the incoming and supervisory lamp. The energization of the trunk circuit at this high level also effects the operation of relay RCV in the two way trunk circuit. A circuit is now closed for operating incoming delay relay ID1 extending from (+), make contact of relay RCV, conductor 9, break contact of outgoing delay relay OD, conductor 10, winding of relay ID1 to (−). Relay ID1 places a closed circuit across the tip and ring conductors T and R leading to the incoming selector which energizes this selector preparatory to the dialing of the first digit. This circuit may be traced from tip conductor T leading to the incoming selector INC. SEL., conductor 4, make contact of relay ID1, conductor 3, conductor 1, upper left hand winding of coil RC, make contact of relay ID1, upper winding of supervisory relay SY1, rectifier 1RE, make contact of relay ID1, lower left hand winding of coil RC, make contact of relay RCV and make contact of relay ID1, conductor 5 to ring conductor R leading to the incoming selector. Although this incoming selector is not shown, it is obvious to those familiar with the automatic telephone art how such a selector is connected to the illustrated terminals for responding to the digits transmitted from the distant office. It is also well known that the relays of the incoming selector apply (+) potential to conductor S for making this particular trunk busy at the banks of the local selector for preventing trunk seizure on an outgoing call.

The current flow over the T and R conductors of the incoming selector through the upper winding of relay SY1 is in the proper direction for operating this relay, which in turn completes a circuit for operating incoming delay relay ID2, this circuit extending from (+), make contact of relay ID1, make contact of relay SY1 and winding of relay ID2 to (−). Relay ID2 closes a locking circuit for itself extending from (+), make contact of relay ID1, make contact and winding of relay ID2 to (−). At the uppermost make contact of relay ID2 a spark absorbing circuit, including the condenser C1 and resistor R1, is connected across the terminals of the lower, inner make contact of relay RCV to prevent sparking at this latter contact when RCV impulses the incoming circuit.

The operator hears the dial tone sent back from the incoming selector and inserts the dial cord into the dial jack. When the dial is operated from its normal position a circuit is closed from the off normal contact of the dial by way of the sleeve conductor of the cord and jack for operating sleeve relay S, this relay remaining operated until the dial has completed the impulsing transmission and is restored to normal. The operation of relay S extends this circuit to sleeve repeater relay SP for operating this relay, which in turn switches the trunk conductors from the repeating coil to the impulse contacts of the dial by way of the dial jack and cord. Opening up of the circuit to the repeat coil of the incoming trunk circuit de-energizes and releases relay POL1 for extinguishing the lamp. Now as the dial is restored to normal impulses are transmitted for opening and closing the trunk conductors, which in turn impulses relay RCV in the distant dial office. Each release of relay RCV opens up the above described circuit leading to the incoming selector and each operation of relay RCV again closes this incoming circuit. Consequently, the number dialed is re-transmitted to the automatic equipment in the dial office by relay RCV. Slow release relay ID1 is not released during this impulse transmission. Between digits relays SP and S are released and when the complete number is dialed the trunk circuit remains connected to the repeating coil circuit RC1.

Referring to the two way trunk circuit in Fig. 2, relay SY1 is energized over the incoming selector T and R conductors when relay RCV is energized and at each release of relay RCV, relay SY1 is held over a circuit extending from (+), break contact of relay RCV, make contact of relay ID2 and lower winding of relay SY1 to (−). By maintaining the lower winding of relay SY1 energized when its upper winding is de-energized, the release of this relay is prevented during impulsing. During the transmission of each digit, relay CHO is operated over a circuit extending from (+), break contact of relay RCV, make contact of relay ID2 and winding of relay CHO to (−). The two make contacts of relay CHO short circuit the two left hand windings of repeat coil RC to remove the impedance of these windings from the circuit to the incoming selector during impulse transmission. The continued operation of relay RCV holds the above described circuit to the winding of relay CHO open for a sufficiently long period to allow this latter relay to release.

When the called party in the unattended dial office answers the call, battery is reversed by the connector in the well known manner for reversing the direction of the current through the winding of relay SY1 for effecting the release of this relay. Resistor R2 is connected across the upper winding of relay SY1 and rectifier 1RE to provide a hold circuit for the connection to the automatic equipment when this battery reversal is effected and current flow through rectifier 1RE is stopped. The release of relay SY1 closes a circuit for operating relay SY2 extending from (+), make contact of relay ID1, make contact of relay ID2, break contact of relay SY1, make contact of relay ID2 and winding of relay SY2 to (—). The operation of relay SY2 reverses the current over the trunk conductors leading to the distant office for effecting the release of polar relay POL1 and the extinguishing of the supervisory lamp to indicate that the called party has answered.

When the conversation is terminated and the called party hangs up the receiver, the battery from the connector is restored to its normal direction for again operating relay SY1, which in turn opens up and releases relay SY2. The release of relay SY2 restores the current flow in the trunk to normal for operating POL1, which in turn lights the lamp as an indication that the called party has hung up the receiver.

When the operator takes down the connection, the removal of the plug from the line jack opens up and releases relay SL, which in turn transfers the trunk circuit from relay POL1 to relay POL for reducing the current in the trunk circuit to its normal low level and for releasing relay POL1. The release of relay POL1 extinguishes the supervisory lamp.

The energization of the trunk circuit at the low level reduces the current flow to the point where relay RCV is released for effecting the release of relay ID1. The release of relay RCV also releases the automatic equipment on the incoming portion of the connection by opening the lower, inner make contact of this relay. Relay ID2 is released by the release of relay ID1, after which relay SY1 is released, this latter relay and relay CHO being operated (but without function) when relay RCV releases and closes the above described circuits to relays SY1 and CHO. The release of relay ID2 opens up and releases relays SY1 and CHO, thus restoring the circuits to normal.

It will now be explained how the circuits function on a call in the other direction, that is, from the dial office to the manual position in the distant office. When the calling subscriber removes the receiver to initiate a call, the calling line is extended by way of the line finder to the selector and when the number associated with the outgoing trunk is dialed the calling line is extended by way of the selector wipers and the selected contacts to the two way trunk circuit. A circuit is now closed for operating calling relay C of the two way trunk circuit extending from (+), upper winding of relay C, break contact of relay ID1, upper left hand winding of repeating coil RC, conductor 1, break contact of reversing relay RV, tip contacts and wipers T of the selector and finder, over the calling line circuit, ring contacts and wipers R of the finder and the selector, break contact of relay RV, conductor 2, lower left hand winding of coil RC, break contact of relay ID1 and lower winding of relay C to (—). Revertive ringing tone is now connected to the calling line as an indication that the distant office trunk is being signaled, the tone extending from the common revertive ring tone conductor, condenser C2, break contact of revertive ringing tone relay RRT, make contact of relay C and over the above traced circuit to the calling line. Outgoing delay relay OD is operated over a circuit extending from (+), make contact of relay C conductor 7, and winding of relay OD to (—). Relay OD applies (+) to the sleeve conductor S leading to the incoming selector, which performs no function on this type of call. This (+) potential is extended back to the sleeve wiper of the local selector and line finder for holding these switches in their operated positions and for holding the cut off relay of the calling line operated. Supervisory relay SY2 is now operated over a circuit extending from (+), make contact of relay C, break contact of relay ID2 and winding of relay SY2 to (—).

On an outgoing call the connection of (+) potential to the sleeve conductor is effective to operate relay HLD of the alarm sender but this operation performs no function in connection with a call of this class. The release of the connection removes (+) potential from the HLD relay winding for effecting the release of this relay. The operation of relay SY2 reverses the low value current flow over the trunk leading to the distant office for operating relay POL in the incoming trunk circuit. The operation of relay POL closes a circuit for lighting the incoming signal lamp extending from (+), break contact of relay SL, make contact of relay POL and the lamp to (—).

When the operator answers the call by plugging into the line jack, relay SL is operated over the previously described circuit for substituting the windings of relay POL1 for the windings of relay POL, thus energizing the trunk circuit at a comparatively high level. This effects the operation of relay RCV in the two way trunk circuit and this relay in turn closes a circuit for operating relay RV extending from (+), make contact of relay RCV, conductor 9, make contact of relay OD and winding of relay RV to (—). The operation of relay RCV completes a locking circuit for relay OD extending from (+), make contact of relay OD, conductor 6, make contact of relay RCV, conductor 7, and winding of relay OD to (—). Since this circuit is independent of the C relay, the OD relay will be maintained operated for keeping this trunk circuit busy until the operator takes down the connection and effects the release of relay OD as will be later described. The operation of relay RV reverses the battery back to the calling line for coin box, metering or supervisory purposes. Relay RRT is also operated at this time over a circuit extending from (+), make contact of relay RCV, conductor 9, make contact of relay OD, conductor 8, break contact and winding of relay RRT to (—). Relay RRT closes a locking circuit for itself extending from (+), make contact of relay OD, conductor 6, make contact and winding of relay RRT to (—).

The energization of the trunk circuit at the comparatively high level is in the wrong direction for operating relay POL1. Consequently, when relay POL is switched out of the trunk circuit, as previously described, it releases for extinguishing the incoming lamp. The operation and locking of relay RRT opens up the circuit to the revertive ringing tone for disconnecting this signal from the calling line and maintaining it disconnected until the connection is released.

The operator now proceeds to handle the call and conversation takes place over the trunk in the conventional manner. When the calling party in the dial office hangs up the receiver to terminate this call, the opening up of the calling line effects the release of relay C which in turn effects the release of relay SY2 for restoring the direction of the current flow over the trunk circuit to normal. Since this energization of the trunk circuit is still at a comparatively high level, relay POL1 will operate and light the supervisory lamp as an indication that the calling party has hung up the receiver.

When the operator takes down the connection the removal of the plug from the line jack releases relay SL and this relay in turn switches the trunk circuit from relay POL1 to relay POL, thus releasing relay POL1, and reducing the energization to a comparatively low level. This effects the release of relay RCV in the two way trunk circuit and this relay in turn effects the release of relays AV and OD. The release of relay POL1 extinguishes the supervisory lamp and the release of relay OD of the two way trunk circuit removes (+) potential from sleeve conductor S for restoring the automatic equipment to normal. The release of relay OD opens up the locking circuit for relay RRT, all of which restores the circuit to normal condition ready for another connection.

It will now be explained how the alarm circuits function to transmit a distinctive signal to the manual position in the distant office in response to a trouble condition in the unattended office. Either the minor relay MI or the major relay MA will be de-energized in any well known manner when a minor or a major alarm condition exists in the unattended office. Major and minor alarms may be caused, for example, by the blowing of major or minor fuses. The circuits for energizing MI and MA are indicated in Fig. 2 by dashed lines to (+). An example of typical circuits represented by these dashed lines can be inspected in Fig. 7 of Wicks Patent 1,901,068, issued March 14, 1933. Relay 705 in the Wicks patent corresponds to my relay MI, while Wicks relay 708 corresponds to my relay MA. Other faults within a step-by-step exchange against which it is customary to furnish protection are described at page 161, lines 7–25 of "Telephone Theory and Practice," vol. 3, by K. B. Miller. An example of another type of fault protection may be examined in Fig. 1 of Patent 2,315,378 to Powell, issued March 30, 1943. In this patent, relay 14 is maintained energized unless one of the tens relays, T1 through T10, sticks. Similarly, relay 23 is maintained energized unless one of the units relays, U1 through U10 (Fig. 5), sticks, thus developing a fault. In this specification, the word "fault" indicates an abnormal condition, i. e., actual breakdown of apparatus; it is not descriptive of such conditions as all trunks being busy or switch going to overflow position.

The release of either MA or MI opens up and releases signal relay SIG. The release of relay SIG closes a circuit for operating relay L of the alarm sender and relay C of the two way trunk circuit, the circuit extending from (+), upper winding of relay C, break contact of relay ID1, upper left hand winding of repeating coil RC, conductor 1, break contact of relay RV, break contact of relay SA of the alarm sender, winding of relay L, rectifier 2RE, conductor 12, break contact of relay SIG, conductor 13, break contact of relay RV, conductor 2, lower left hand winding of repeating coil RC, break contact of relay ID1 and lower winding of relay C to (−). The operation of relay C closes an obvious circuit for operating relay OD and this relay in turn applies (+) potential to the sleeve conductor associated with this trunk in the banks of the selectors to make this trunk busy to outgoing calls.

The operation of relay C also closes a circuit for operating relay SY2 extending from (+), make contact of relay C, break contact of relay ID2 and winding of relay SY2 to (−). The operation of relay SY2 reverses the battery connection to the trunk to the distant office for operating polar relay POL and this relay in turn closes the previously described circuit for lighting the incoming lamp.

Referring back to the operation of relay OD of the two way trunk circuit, the (+) potential applied to the sleeve conductor extending down to the winding of hold relay HLD of the alarm sender for operating this relay, which in turn closes a locking circuit for itself extending from (+), break contact of relay SIG, conductor 11, make contact and winding of relay HLD to (−). This circuit from (+) at the break contact of relay SIG extends through make contacts of relays HLD and L to the winding of slow acting relay SA for operating this relay. The operation of relay SA opens up the above described circuit leading to the two way trunk for effecting the release of relays C and L. The release of relay C opens up and releases relays SY2 and OD. The release of relay L opens up and releases relay SA, after which the above described circuit to the two way trunk is again closed for again operating relay C and L. The operation of relay L again completes the circuit for operating relay SA and the operation of relay C again completes the circuit for operating relay OD. Relay C also completes the previously described circuit for operating relay SY2 which again reverses the current flow to the inter-office trunk, this current flow having been restored to normal when relay SY2 was released by the release of relay C.

The operation of relay SA again opens up the line conductors to the two way trunk circuit for effecting the release of relays C and L, after which relays OD, SY2 and SA are released as in the previously described manner. This cycle of operations continues until the trouble in the unattended office is cleared or until the operator in the attended office dials the alarm checking number for determining the nature of the trouble and for clearing out the circuits. The intermittent reversal of the battery feed to the two wire trunk to the distant office is effective to intermittently operate polar relay POL for flashing the incoming lamp, thus providing the operator with a distinctive signal indicating that the trunk is being used to transmit an alarm signal instead of to handle a regular telephone call.

If the trouble condition is cleared up, the released MA or MI relay will again be operated for completing the circuit for operating relay SIG and this relay in turn opens up the line conductors leading to the two way trunk circuit for clearing out this circuit. Relay SIG disconnects (+) potential from the circuit which locks relay HLD operated, thus releasing this relay and rendering the two way trunk circuit non-busy or selectable for regular calls. Since this restores the trunk circuit to normal, relay POL in the distant office stops its intermittent operations and the flashing of the lamp is discontinued.

In the event that the trouble condition is not cleared up the distant office operator dials the alarm checking number indicated in the left hand portion of Fig. 1. When the connector seizes this number, sleeve conductor S is energized for operating trunk relay T. Relay T applies (+) potential to the common generator and tone start conductor for starting the tone mechanism operating. Relay T also applies (+) potential to the locking circuit for relay SIG to prevent the release of this relay and the consequent interference with the trunk circuit when the operator is checking the alarm condition. Relay T also connects neon tube NT across the tip and ring conductors T and R associated with the alarm checking number at the connector banks for tripping the ring. Since tube NT will not pass sufficient current to operate the usual reverse battery relay on the called end of the connector, the battery is not reversed back to the calling line on a call of this class.

In the event of a minor alarm, relay MI will be released and the operator will hear the busy tone over a circuit extending from the common busy tone conductor, break contact of relay MI, make contact of relay MA, conductor 14, condenser C3 and lower winding of tone coil TC to (+). This tone is induced into the upper winding of coil TC and since this winding is connected to the tip and ring conductors of the alarm checking number through the condenser C4, the operator will hear the tone. In the event of a major alarm, relay MA will be released and when the operator dials this checking number no tone will be received because the lower winding of relay TC is connected to an open circuit at the uppermost break contact of relay MA. If there is no trouble condition existing when this alarm checking number is dialed, then both the major relay MA and the minor relay MI will be operated and the operator will hear generator tone extending from the common generator tone source, make contact of relays MI and MA in series and over the previously described circuit including tone coil TC.

In the event that one or both alarm relays MA and MI is released when the alarm checking number is dialed, the operation of relay T applies (+) through the lower break contact of relay SIG and the break contact of the MA or the MI relay to the winding of the MAL or the MIL relay to (—). The operation of either one of these latter relays closes an obvious locking circuit for itself by way of its other winding and the operation of either of these relays extends (+) to the winding of relay SIG for operating this relay and for locking it as long as the connection is set up to the alarm checking number. Furthermore, when the trouble condition is cleared and the MA and MI relays are both restored to normal, the MAL and MIL relays are released and the original energizing circuit for relay SIG is completed for operating this relay and restoring the circuits to normal.

The above description assumes that the operator dials the alarm checking number over another trunk, separate from the one over which the alarm indication is transmitted. The circuits are so arranged that the operator can plug into the line jack associated with the flashing incoming lamp signal, then plug the dial cord into the dial jack and dial back over the same trunk over which the flashing signal is transmitted. In this case, when the operator plugs into the line jack in response to noting the flashing incoming lamp, relay SL of the incoming trunk circuit is operated as previously described to switch the trunk line from high resistance polar relay POL to low resistance polar relay POL1. This switches the trunk from a low level energization to a high level energization which operates relay RCV in the two way trunk circuit. Relay RCV closes a circuit for operating relay RV extending from (+), make contact of relay RCV, conductor 9, make contact of relay OD and winding of relay RV to (—). This same circuit extends to the winding of relay RRT for operating and locking this relay until relay OD releases, this operation of relay RRT performing no function at this time. The release of relay SA in the alarm sender closes the line conductors extending to the two way trunk circuit for operating relays L and C, after which relays OD and SA are operated and the trunk circuit is opened for releasing relays L and C for again releasing relay OD, all as previously described. The operation and release of relay C operates and releases relay SY2 in the previously described manner. Since the operator has plugged into the line jack in the distant office, the trunk line is energized at a high level and since relays RCV and RV are operated the battery is reversed to the alarm sender circuit, including relay L and rectifier 2RE, thus preventing the operation of relays L and C. Consequently, relays C and OD remain de-energized and relay RCV closes the circuit for operating relay ID1 over the break contact of relay OD. The circuit to the incoming selector is now closed, relays SY1 and ID2 now operate, thus permitting the operator to dial back over this same trunk to the alarm checking number or a line number, all in the manner previously described in connection with a call of this kind.

While one embodiment of the invention has been described, it will be understood that various modifications may be made therein without departing from the true spirit and scope of the invention.

What is claimed is:

1. In a telephone system, a first exchange, a second exchange, a trunk line interconnecting said exchanges, means in said first exchange operative in response to the initiation of a telephone call to said second exchange to cause a steady transmission of a calling signal over said trunk line, means in said first exchange operative in response to the existence of an alarm condition in said first exchange to cause an intermittent transmission of said calling signal over said trunk line, a call indicating device in said second exchange, and means in said second exchange operative in response to the receipt over said trunk line of said steadily transmitted signal to steadily operate said call indicating device to indicate a telephone call and operative in response to the receipt over said trunk line of said intermittently transmitted signal to intermittently operate said call indicating device to indicate an alarm call.

2. In a telephone system, an unattended exchange, an attended exchange, a trunk line interconnecting said exchanges, means in said unattended exchange operative in response to the initiation of a telephone call to said attended exchange to permanently change the polarity on said trunk line and thereby steadily transmit a calling signal over said trunk line, means in said unattended exchange operative in response to the existence of an alarm condition in said unattended exchange to periodically change the polarity on said trunk line and thereby intermittently transmit said calling signal over said trunk line, a call indicating device in said attended exchange, means in said attended exchange operative in response to said permanent change of polarity on said trunk line to steadily operate said call indicating device to indicate a telephone call and operative in response to said periodic change of polarity on said trunk line to intermittently operate said call indicating device to indicate an alarm call.

3. In a telephone system, a first exchange, a second exchange, trunk lines interconnecting said exchanges, signal transmitting means associated with said trunk lines in said first exchange, connecting means in said first exchange, alarm sending means in said first exchange, said signal transmitting means being operative upon seizure of the associated trunk line by said connecting means in response to the initiation of a telephone call to said second exchange to transmit a calling signal over said trunk line, and being operative upon seizure of the associated trunk line by said alarm sending means in response to the existence of an alarm condition to transmit a different calling signal over said trunk line, visual call indicating means in said second exchange, means in said second exchange operative in response to the receipt over said trunk line of said first mentioned signal to operate said call indicating means in one way and operative in response to the receipt over said trunk line of said second mentioned signal to operate said call indicating means in a different way, alarm checking means in said first exchange, a numerical switch in said first exchange, means in said second exchange for directively setting said numerical switch over one of said trunk lines to establish connection with said alarm checking means, said alarm checking means being responsive to the establishment of said connection to transmit a signal characteristic of the type of alarm to said second exchange by way of said switch and cause the alarm sending means to discontinue the transmission of said second mentioned calling signal.

4. In a telephone system, a two-wire signaling circuit having a signal transmitting end and a signal receiving end, a relay at the signal transmitting end of said circuit, a battery feed device at the signal receiving end of said circuit, means at the signal transmitting end for closing a loop over said circuit in series with a winding of said relay to cause the operation of said battery feed device and the energization of said relay winding, means responsive to said energization for opening said loop circuit to cause the release of said battery feed device and the de-energization of said relay winding, whereby the transmission to said receiving end of a periodically interrupted signal is effected, a reversal device at said signal receiving end, means operative in response to the acknowledgment of said signal to actuate said reversal device, said device being effective upon actuation to reverse the current flow over said circuit, and a unidirectional current conducting device at the signal transmitting end connected in said circuit so that in response to the reversal of current flow over said circuit the operation of said battery feed device and the energization of said relay winding are prevented and the transmission of said interrupted signal discontinued.

5. In a telephone system, a subscriber's station, an exchange, a line connecting said station with said exchange, a battery feed circuit in said exchange having a battery feed device at one end thereof, means responsive to the initiation of a telephone call by said subscriber to steadily close a loop across said circuit for steadily operating said battery feed device, an alarm transmitting device including a relay and also including means operative in response to the existence of an alarm condition to close a loop across said circuit in series with a winding of said relay to cause the operation of said battery feed device and the operation of said relay, means responsive to the operation of said relay for opening a point in said last mentioned loop to cause the release of said relay and said battery feed device to start an interrupting action between said last mentioned means and said relay and thereby effect an intermittent operation of said battery feed device, and means responsive to the steady operation of said battery feed device to indicate a telephone call and responsive to the intermittent operation of said battery feed device to indicate an alarm call.

6. In a telephone system, a subscriber's station, an exchange, a line connecting said station with said exchange, a battery feed circuit in said exchange having a battery feed device at one end thereof, means responsive to the initiation of a telephone call by said subscriber to steadily close a loop across said circuit for steadily operating said battery feed device, an alarm transmitting device including a relay and also including means operative in response to the existence of an alarm condition to close a loop across said circuit in series with a winding of said relay to cause the operation of said battery feed device and the operation of said relay, means responsive to the operation of said relay for opening a point in said last mentioned loop to cause the release of said relay and said battery feed device to start an interrupting action between said last mentioned means and said relay and thereby effect an intermittent operation of said battery feed device, means responsive to the steady operation of said battery feed device to indicate a telephone call and responsive to the intermittent operation of said battery feed device to indicate an alarm call, and means operative upon seizure of said battery feed circuit by said alarm transmitting device for guarding said circuit against seizure in a telephone call.

7. In a telephone system, a subscriber's station, an exchange, a line connecting said station with said exchange, a battery feed circuit in said exchange having a battery feed device at one end thereof, means responsive to the initiation of a telephone call by said subscriber to steadily close a loop across said circuit for steadily operating said battery feed device, an alarm transmitting device including a relay, a unidirectional current conducting device and also including means operative in response to the existence of an alarm condition to close a loop across said circuit in series with a winding of said relay to cause the operation of said battery feed device and the operation of said relay, means responsive to the operation of said relay for opening a point in said last mentioned loop to cause the release of said relay and said battery feed device to start an interrupting action between said last mentioned means and said relay and thereby effect an intermittent operation of said battery feed device, means responsive to the steady operation of said battery feed device to indicate a telephone call and responsive to the intermittent operation of said battery feed device to indicate an alarm call, a reversal device at the battery feed end of said circuit, answering means operative in response to the acknowledgment of a call to actuate said reversal device, said device being effective upon actuation to reverse the current flow over said circuit, and said unidirectional current conducting device being connected in said circuit so that in response to the reversal of current flow the operaton of said battery feed device and the energization of said relay winding are prevented to discontinue the indication of said alarm call.

8. In a telephone system, a subscriber's station, an exchange, a line connecting said station with said exchange, a battery feed circuit in said exchange having a battery feed device at one end thereof, means responsive to the initiation of a telephone call by said subscriber to steadily close a loop across said circuit for steadily operating said battery feed device, an alarm transmitting device including a relay, a unidirectional current conducting device and also including means operative in response to the existence of an alarm condition to close a loop across said circuit in series with a winding of said relay to cause the operation of said battery feed device and the operation of said relay, means responsive to the operation of said relay for opening a point in said last mentioned loop to cause the release of said relay and said battery feed device to start an interrupting action between said last mentioned means and said relay and thereby effect an intermittent operation of said battery feed device, means responsive to the steady operation of said battery feed device to indicate a telephone call and responsive to the intermittent operation of said battery feed device to indicate an alarm call, means operative upon seizure of said battery feed circuit by said alarm transmitting device for guarding said circuit against seizure in a telephone call, a reversal device at the battery feed end of said circuit, answering means operative in response to the acknowledgment of a call to actuate said reversal device, said device being effective upon actuation to reverse the current flow over said circuit, and said unidirectional current conducting device being connected in said circuit so that in response to the reversal of current flow the operation of said battery feed device and the energization of said relay winding are prevented to discontinue the indication of said alarm call.

9. In a telephone system, a subscriber's station, an unattended exchange, a line connecting said station with said exchange, an attended exchange, a trunk line interconnecting said exchanges, a trunk circuit at the unattended exchange end of said trunk line, said trunk circuit including a battery feed circuit having a battery feed device at one end thereof, means responsive to the initiation of a telephone call by said subscriber to steadily close a loop across said battery feed circuit for steadily operating said battery feed device, an alarm transmitting device including a relay and also including means operative in response to the existence of an alarm condition in said unattended exchange to close a loop across said battery feed circuit in series with a winding of said relay to cause the operation of said battery feed device and the operation of said relay, means responsive to the operation of said relay for opening a point in said last mentioned loop to cause the release of said relay and said battery feed device to start an interrupting action between said last mentioned means and said relay and thereby effect an intermittent operation of said battery feed device, means responsive to the steady operation of said battery feed device to cause the steady transmission of a calling signal over said trunk line and responsive to the intermittent operation of said battery feed device to cause the intermittent transmission of said calling signal over said trunk line, a call indicating device in said attended exchange, and means in said attended exchange operative in response to the receipt over said trunk line of said steadily transmitted signal to steadily operate said call indicating device to indicate a telephone call and operative in response to the receipt over said trunk line of said intermittently transmitted signal to intermittently operate said call indicating device to indicate an alarm call.

10. In a telephone system, a subscriber's station, an unattended exchange, a line connecting said station with said exchange, an attended exchange, a two-way trunk line interconnecting said exchanges, a trunk circuit at the unattended exchange end of said trunk line, said trunk circuit including a battery feed circuit having a battery feed device at one end thereof, means responsive to the initiation of a telephone call by said subscriber to steadily close a loop across said battery feed circuit for steadily operating said battery feed device, an alarm transmitting device including a relay, a unidirectional current conducting device and also including means operative in response to the existence of an alarm condition in said unattended exchange to close a loop across said battery feed circuit in series with a winding of said relay to cause the operation of said battery feed device and the operation of said relay, means responsive to the operation of said relay for opening a point in said last mentioned loop to cause the release of said relay and said battery feed device to start an interrupting action between said last mentioned means and said relay and thereby effect an intermittent operation of said battery feed device, means responsive to the steady operation of said battery feed device to cause the steady transmission of a calling signal over said trunk line and responsive to the intermittent operation of said battery feed device to cause the intermittent transmission of said calling signal over said trunk line, a call indicating device in said attended exchange, means in said attended exchange operative in response to the receipt over said trunk line of said steadily transmitted signal to steadily operate said call indicating device to indicate a telephone call and operative in response to the receipt over said trunk line of said intermittently transmitted signal to intermittently operate said call indicating device to indicate an alarm call, a reversal device at the battery feed end of said battery feed circuit operative, in response to the transmission over said trunk line of a signal in the opposite direction upon answering of the call at the attended exchange, to reverse the current flow over said battery feed circuit, said unidirectional current conducting device being connected in said circuit so that in response to the reversal of current flow the operation of said battery feed device and the energization of said relay winding are prevented and the transmission of said calling signal discontinued.

THEODORE FRANKEL.

REFERENCES CITED

The following references are of record in the file of this patent:

UNITED STATES PATENTS

| Number | Name | Date |
|---|---|---|
| 1,616,738 | Benson | Feb. 8, 1927 |
| 1,805,726 | Saunders | May 19, 1931 |
| 1,897,069 | Newsom | Feb. 14, 1933 |
| 1,901,068 | Wicks | Mar. 14, 1933 |
| 1,912,450 | Hatton et al. | June 6, 1933 |
| 1,974,087 | Stocker | Sept. 18, 1934 |
| 2,233,282 | Buchanan | Feb. 25, 1941 |
| 2,262,595 | Walters | Nov. 11, 1941 |
| 2,278,172 | Dimond | Mar. 31, 1942 |
| 2,291,481 | McDavitt | July 28, 1942 |
| 2,372,022 | Schneckloth | Mar. 20, 1945 |